No. 743,669. PATENTED NOV. 10, 1903.
M. TRAUTHEN.
HEADING TOOL.
APPLICATION FILED MAR. 14, 1903.
NO MODEL.

Witnesses
D. O. Barnell.
Frank R. Olsen.

Inventor
Mathias Trauthen,
By Howard J. Cowgill
Attorney

No. 743,669.

Patented November 10, 1903.

UNITED STATES PATENT OFFICE.

MATHIAS TRAUTHEN, OF OMAHA, NEBRASKA.

HEADING-TOOL.

SPECIFICATION forming part of Letters Patent No. 743,669, dated November 10, 1903.

Application filed March 14, 1903. Serial No. 147,766. (No model.)

*To all whom it may concern:*

Be it known that I, MATHIAS TRAUTHEN, a citizen of the United States, residing at Omaha, in the county of Douglas and State of Nebraska, have invented certain new and useful Improvements in Heading-Tools; and I do hereby declare the following to be a full, clear, and exact description of the invention, such as will enable others skilled in the art to which it appertains to make and use the same.

My invention relates to heading-tools; and it is the object thereof to provide a tool for heading and calking stay-bolts and the like having simple means for keeping the same centered on the bolt, thereby avoiding the waste of time in recentering the tool when the same is thrown out of position by the recoil from a blow.

My invention consists in the elastic centering means employed in my tool, as will be more fully set forth hereinafter.

The accompanying drawings show a tool embodying my invention, in which—

Figure 1:
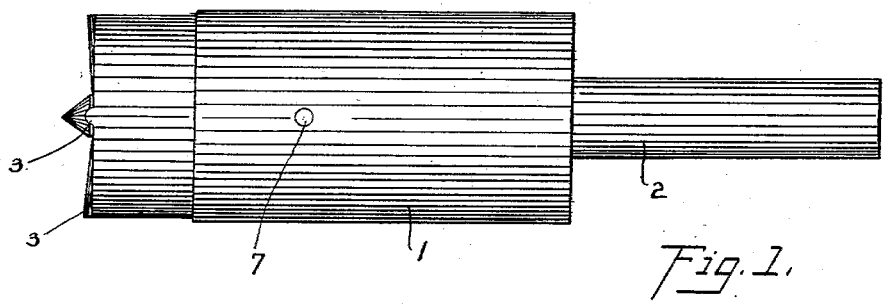
Figure 2:
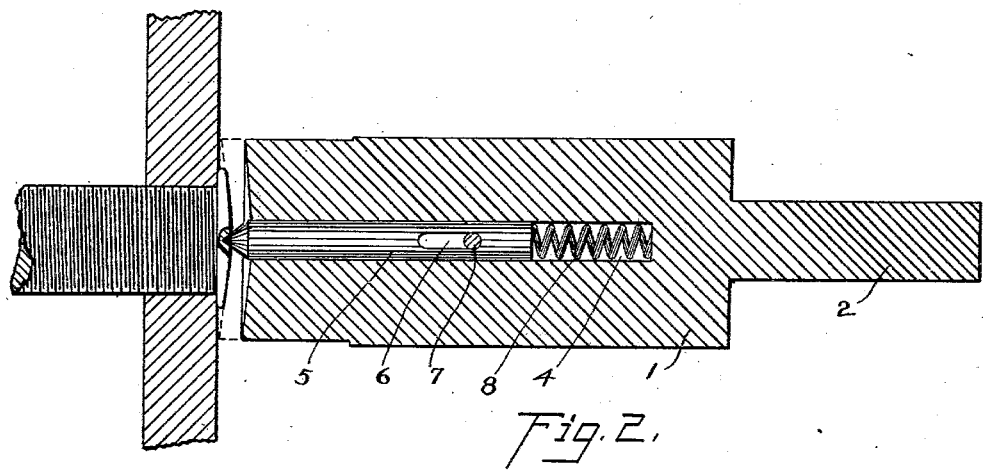
Figure 3:
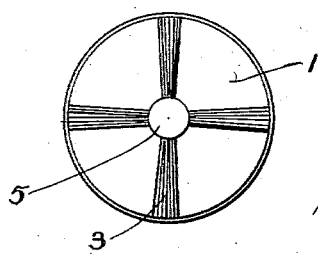

Figure 1 is a side view of the corrugated or "roughing" form of the tool. Fig. 2 is a sectional view of the plain or finishing tool, the same being shown in operative position in heading or calking a stay-bolt; and Fig. 3 is an end view of the corrugated tool.

The general form of my tool is the same as that ordinarily used for heading and calking stay-bolts in connection with the pneumatic hammers in common use and comprising the tool-body 1 and shank 2 therefor. The forward end of the tool-body 1 has a slightly-conical depression therein, as shown, and said depression may be plain and smooth, as shown in Fig. 2, or have the radially-extending ridges or corrugations 3 thereon, as indicated in Figs. 1 and 3.

A hole or recess 4 is made through the center of the body 1 and extending from the conically-depressed face of the body through the greater part of the length thereof. Fitting snugly within the hole 4 is the pin or plunger 5, having the slot 6 therein. Through the said slot 6 and the body 1 is passed a pin 7, which prevents the plunger from being removed from the hole, but permits a reciprocative movement thereof. A coil-spring 8 in the opening behind the plunger normally presses the same outward as far as permitted by the pin 7. The outer end of the plunger is pointed, as shown, and the position of the slot 6 and pin 7 is such that the pointed end normally projects beyond the end of the tool-body, as shown.

The manner of using the tool is shown in Fig. 2. A center mark is made in the bolt to be headed and the point of the plunger is inserted therein. When used with a pneumatic hammer, the shank 2 enters a guideway in the hammer-head, while the blow of the hammer is received on the shoulder formed at the end of the tool-body 1 adjacent to the shank. When the blow of the hammer is received, the tool-body is driven against the bolt, as indicated in dotted lines in Fig. 2, and forms the head in the usual manner. After the blow the tool-body recoils away from the bolt, but is kept centered by the plunger, which is pressed outward by the spring 8, and maintains engagement with the center mark in the bolt.

It will be noted that while my invention is particularly adapted to use with stay-bolt-heading tools the same may be applied to any heading or calking tool the use of which requires continued hammering on any one center.

Now, having described my invention, what I claim, and desire to secure by Letters Patent, is—

1. In a heading-tool, a tool-body, a plunger carried thereby adapted to engage a center, and actuating means for said plunger to cause the same to maintain engagement with the center during the recoil of the tool-body.

2. A centering device for heading-tools comprising, in combination with a tool-body, a plunger adapted to engage with a center, and a spring for maintaining said plunger in engagement with the center during the recoil of the tool-body.

3. A heading-tool comprising a tool-body, a recess formed in said body, a plunger in said recess, a spring normally pressing outward said plunger, and means limiting the movement of said plunger.

In testimony whereof I hereunto affix my signature in presence of two witnesses.

MATHIAS TRAUTHEN.

Witnesses:
 HOWARD J. COWGILL,
 D. O. BARNELL.